United States Patent
Shetty et al.

(10) Patent No.: US 11,887,034 B2
(45) Date of Patent: Jan. 30, 2024

(54) SYSTEM AND METHOD FOR OPTIMIZING DESIGN, WORKFLOWS, PERFORMANCE, AND CONFIGURATIONS BASED ON DESIGN ELEMENTS

(71) Applicant: Cerner Innovation, Inc., Kansas City, MO (US)

(72) Inventors: Rohith Shetty, Bangalore (IN); Lakshmidas Mallya, Bangalore (IN); Arun Kharidehal, Bangalore (IN); Reema Dsouza, Mangalore (IN); Winston Rohan Dsouza, Karwar (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 18/312,235

(22) Filed: May 4, 2023

(65) Prior Publication Data
US 2023/0274212 A1 Aug. 31, 2023

Related U.S. Application Data

(63) Continuation of application No. 17/201,086, filed on Mar. 15, 2021, now Pat. No. 11,681,964.

(51) Int. Cl.
*G06Q 10/0633* (2023.01)
*G06F 3/0482* (2013.01)
*G06F 3/04847* (2022.01)
*G06Q 10/0639* (2023.01)

(52) U.S. Cl.
CPC ....... *G06Q 10/0633* (2013.01); *G06F 3/0482* (2013.01); *G06F 3/04847* (2013.01); *G06Q 10/06393* (2013.01)

(58) Field of Classification Search
CPC ........ G06F 1/00–2123/00; G06Q 10/00–50/00
USPC .............................................. 705/7.11–7.42
See application file for complete search history.

(56) References Cited

U.S. PATENT DOCUMENTS

| | | | | |
|---|---|---|---|---|
| 5,999,908 A | * | 12/1999 | Abelow | G06Q 30/0203 434/118 |
| 6,397,192 B1 | * | 5/2002 | Notani | G06Q 10/10 705/7.26 |
| 6,405,364 B1 | * | 6/2002 | Bowman-Amuah | G06Q 10/06 717/124 |
| 6,907,546 B1 | | 6/2005 | Haswell et al. | |
| 7,848,942 B2 | * | 12/2010 | Sadiq | G06Q 10/063 709/201 |

(Continued)

FOREIGN PATENT DOCUMENTS

EP 1269321 B1 6/2008

*Primary Examiner* — Alan S Miller
(74) *Attorney, Agent, or Firm* — Invoke

(57) ABSTRACT

Methods, systems, and computer-readable media are disclosed herein for an application that optimizes the design element and workflow configuration of a target computer program. Generally, the application automatically displays preview images of graphical user interface in response to a user-input answer in a questionnaire, where the preview image accounts for design element and/or workflow impacts to the graphical user interface of the target computer program. The application also predicts performance indicators for target computer programs that account for design elements and/or workflow steps directly or indirectly selected through the user-input answers.

20 Claims, 19 Drawing Sheets

(56) References Cited

U.S. PATENT DOCUMENTS

| | | | |
|---|---|---|---|
| 8,185,491 B2 | 5/2012 | Kuester et al. | |
| 8,504,405 B2 | 8/2013 | Miller et al. | |
| 8,671,352 B1* | 3/2014 | Hsu | G06F 8/38 715/762 |
| 8,752,010 B1* | 6/2014 | Penner | G06F 8/34 717/109 |
| 8,769,484 B2 | 7/2014 | Arsanjani et al. | |
| 8,938,679 B1* | 1/2015 | Hsu | G06F 3/0486 715/230 |
| 9,009,677 B2* | 4/2015 | Zhao | G06F 11/3466 717/127 |
| 9,389,759 B2* | 7/2016 | Hsu | G06F 3/0484 |
| 9,600,792 B2* | 3/2017 | Foehr | G06Q 10/06316 |
| 10,614,919 B1* | 4/2020 | Yedwab | G16H 10/60 |
| 10,783,162 B1* | 9/2020 | Montague | G06F 16/2465 |
| 11,334,471 B1* | 5/2022 | Stocker | G06F 11/3688 |
| 2002/0199156 A1 | 12/2002 | Chess et al. | |
| 2003/0149714 A1* | 8/2003 | Casati | G06Q 10/10 718/100 |
| 2006/0259506 A1* | 11/2006 | Kim | G06F 9/451 707/999.102 |
| 2007/0088583 A1* | 4/2007 | Chen | G06Q 10/0633 705/7.27 |
| 2007/0161871 A1* | 7/2007 | Haider | G16H 10/20 128/920 |
| 2007/0168225 A1* | 7/2007 | Haider | G16H 10/20 128/920 |
| 2008/0147453 A1* | 6/2008 | Kogan | G06Q 10/06 705/7.26 |
| 2009/0182856 A1* | 7/2009 | Gotta | H04L 41/046 709/223 |
| 2010/0131482 A1* | 5/2010 | Linthicum | G16H 40/63 707/706 |
| 2010/0223557 A1* | 9/2010 | Kenney | G06Q 10/10 707/E17.014 |
| 2011/0078426 A1* | 3/2011 | Stoitsev | G06Q 10/04 718/107 |
| 2012/0143648 A1* | 6/2012 | Wood | G06Q 10/0633 705/7.26 |
| 2013/0204966 A1* | 8/2013 | Lee | G06Q 10/0633 709/217 |
| 2014/0337706 A1* | 11/2014 | Hsu | G06F 3/0486 715/234 |
| 2016/0371622 A1* | 12/2016 | Kurian | G06Q 10/06316 |
| 2017/0083290 A1* | 3/2017 | Bharthulwar | G06F 9/4856 |
| 2018/0275971 A1* | 9/2018 | Parsolano, III | G06F 8/35 |
| 2019/0205792 A1* | 7/2019 | Huang | G06F 9/4881 |
| 2020/0004604 A1* | 1/2020 | Lavoie | G06F 16/907 |
| 2020/0321084 A1* | 10/2020 | Bucur | G16H 10/60 |
| 2022/0215606 A1* | 7/2022 | Radford | G06F 40/103 |

* cited by examiner

Analytics Driven Design Visuals 0.1

Lakshmidas Mallya | Options ▾

Main Control Parameters

| | |
|---|---|
| Client Mnemonic: | Select Client |
| Client Name: | |
| Project Name: | Select Project |
| **Solution: | Select Solution |
| Previous Configuration Saves: | Select Previous Config Saves |
| Prepare to run Design Visuals for the first time? | ☐ |
| Would you like to view Design Visuals Metrics? | ☐ |
| Would you like to View the changes in real-time? | ☐ |
| Would you like to View the Workflow Scripts? | ☐ |
| Would you like to View the DCW Data? | ☐ |
| Would you like to View the Workflow Design Data? | ☐ |
| Last Updated Date/Time: | |
| Save Configuration | |

*FIG. 5.*

| Configuration | Questionnaire | Workflow Designer | Workflow Scripts | Data Collection Workbook | Metrics Window |

Anesthesia Solution Design Visuals: Anesthesiology-Day of Surgery Overview

« PREVIOUS                                                                                         NEXT »

| Key | Anesthesia Patient Demographics ~606 | | Model Recco. | Comments | QA |
|---|---|---|---|---|---|
| | Do you want to change the Patient Demographics Values? ~614 | ☐ No ~610 | | | |

| Key | Pre-Admission Testing (PAT) ~608 | | Model Recco. | Comments | QA |
|---|---|---|---|---|---|
| | Do you perform Pre-Admission Testing? ~602 | ☐ No | | | |

| Key | Preop Documentation | | Model Recco. | Comments | QA |
|---|---|---|---|---|---|
| | Would you be Using Preanesthesia Powerplan? | ☐ No | | | |
| 💧 | Where would the Anesthesiologist know the status of the patient if he is pre-op? | Tracking Board Page ▾ | | | |
| 💧 | Where do you document PreOp Height/Weight/NPO? | Powerform/view ▾ | | | |
| 💧 | Would the institute be using Preanesthesia Evaluation Note? | ☑ Yes | Preanesthesia Evaluation Note(S) | | |
| 💧 | Would the Client use standard Note or Custom? | Preanesthesia Note ▾ | Preanesthesia Evaluation Note | | |
| | How will ASA Class be captured and documented for the case? | Preanesthesia Note ▾ | Preanesthesia Evaluation Note | | |
| | How will Anesthesia Type be identified and documented for the case? | Preanesthesia Note ▾ | | | |
| | Would the discussion regarding choice of anesthesia is held with Patient or someone else? | ☑ Yes | Y | | |
| 💧 | Will Anesthesia consent be taken Paper based or EHR Based? | EHR ▾ | EHR | | |
| 💧 | Will Consent be displayed on Page? ~604 | ☑ Yes | | | |
| 💧 | Is a preop block required? | ☑ Yes | | | |
| 💧 | Will we chart any necessary meds/actions related to the procedure performed in preop? | ☐ Yes | | | |
| 💧 | Would the Client use standard Powerplan or Custom? | ANES Adult Panop P ▾ | ANES Adult Perioperative Phased(S) | | |

| Key | Additional as per Requirement | | Model Recco. | Comments | QA |
|---|---|---|---|---|---|

| Key | Initiation | | Model Recco. | Comments | QA |
|---|---|---|---|---|---|
| 💧 | Patient search can be done using? | Surgical Area/Patient N... ▾ | Surgical Area/Patient Name/Case Nu... | | |

| Configuration | Questionnaire | Workflow Designer | Workflow Scripts | Data Collection Workbook | Metrics Window |
| --- | --- | --- | --- | --- | --- |

Anesthesia Solution Design Visuals: Anesthesiology-Day of Surgery Overview

« PREVIOUS                                                                                                              NEXT »

| Key | Anesthesia Patient Demographics | | Model Recco. | Comments | QA |
| --- | --- | --- | --- | --- | --- |
| | Do you want to change the Patient Demographics Values? ~614 | ☑ Yes ~612 | | | ☐ |

| Key | Pre-Admission Testing (PAT) | | Model Recco. | Comments | QA |
| --- | --- | --- | --- | --- | --- |
| | Do you perform Pre-Admission Testing? | ☐ No | | | ☐ |

| Key | Precp Documentation | | Model Recco. | Comments | QA |
| --- | --- | --- | --- | --- | --- |
| 💧 | Would you be Using Preanesthesia Powerplan? | ☐ No | | | ☐ |
| 💧 | Where would the Anesthesiologist know the status of the patient if he is pre-op? | Tracking Board Page ▾ | | | ☐ |
| 💧 | Where do you document PreOp Height/Weight/NPO? | Powerform/view ▾ | | | ☐ |
| 💧 | Would the institute be using Preanesthesia Evaluation Note? | ☑ Yes | Preanesthesia Evaluation Note(S) | | ☐ |
| 💧 | Would the Client use standard Note or Custom? | Preanesthesia Note ▾ | Preanesthesia Evaluation Note | | ☐ |
| 💧 | How will ASA Class be captured and documented for the case? | Preanesthesia Note ▾ | Preanesthesia Evaluation Note | | ☐ |
| 💧 | How will Anesthesia Type be identified and documented for the case? | Preanesthesia Note ▾ | | | ☐ |
| 💧 | Would the discussion regarding choice of anesthesia is held with Patient or someone else? | ☑ Yes | Y | | ☐ |
| 💧 | Will Anesthesia consent be taken Paper based or EHR Based? | EHR ▾ | EHR | | ☐ |
| 💧 | Will Consent be displayed on Page? | ☑ Yes | | | ☐ |
| 💧 | Is a preop block required? | ☑ Yes | | | ☐ |
| 💧 | Will we chart any necessary meds/actions related to the procedure performed in preop? | ☐ Yes | | | ☐ |
| 💧 | Would the Client use standard Powerplan or Custom? | ANES Adult Panop P ▾ | ANES Adult Perioperative Phased(S) | | ☐ |

| Key | Additional as per Requirement | | Model Recco. | Comments | QA |
| --- | --- | --- | --- | --- | --- |

| Key | Initiation | | Model Recco. | Comments | QA |
| --- | --- | --- | --- | --- | --- |
| | Patient search can be done using? | Surgical Area:Patient N... | Surgical Area:Patient Name:Case Nu... | | ☐ |

FIG. 6B.

| Key | Anesthesia Patient Demographics | | Model Reco. | Comments | QA |
|---|---|---|---|---|---|
| | Do you want to change the Patient Demographics Values? ~614 | ↑ | Yes | | ☑ |
| | Patient Demographics may include how many rows and columns? ~616 | | 4,5 | | |
| | Patient demographics color of the background? | | Background Color RGB (0,100,145) | | ☑ |
| | Patient demographics color of the Mandatory Label | › | Label Font Color RGB (255,255,28) | | ☑ |
| | Patient demographics color of the Mandatory Value | › | Value Font Color RGB (255,255,28) | | ☑ |
| | Patient demographics Mandatory Value in Bold or No | › | Yes Y,N | | ☑ |
| | Patient demographics Mandatory Label in Bold or No | › | Yes Y,Y | | ☑ |
| | Should Patient demographics contain fields? | ↑ | Yes | | |
| | Select Patient Demographics Components | | Yes | | |
| | Patient Name | | Yes Required | › | ☑ |
| | Allergies | | Yes Required | › | ☑ |
| | PONV Risk Score | | Yes Required | › | ☑ |
| | Anesthesia Reaction | | Yes Required | › | ☑ |
| | ASA Class | | Yes Normal | › | ☑ |
| | MRN | | Yes Required | › | ☑ |
| | Height | | Yes Normal | › | ☑ |
| | Surgeon | | Yes Required | › | ☑ |
| | Anes. Type | | Yes Required | › | ☑ |
| | Power Notes | | Yes Normal | › | ☑ |
| | Age | | Yes Required | › | ☑ |

*FIG. 6C.*

| Key | Anesthesia Patient Demographics | | Model Recco. | Comments | QA |
|---|---|---|---|---|---|
| | Do you want to change the Patient Demographics Values? | ☐ No | | | |

| Key | Pre-Admission Testing (PAT) | | Model Recco. | Comments | QA |
|---|---|---|---|---|---|
| | Do you perform Pre-Admission Testing? | ☐ No | | | |

| Key | Preop Documentation | | Model Recco. | Comments | QA |
|---|---|---|---|---|---|
| | Would you be Using Preanesthesia Powerplan? | ☑ Yes | | | |
| | What powerplan would the physician initiate? | Choose An Option ▼ | | | |
| | Would a preop assessment be documented by nurse? | ☐ No | | | |
| | How would the Preop Nurse intimate Anesthesiologist that the Patient is ready for review? | Choose An Option ▼ | Message Center | | |
| | How would the Preop Nurse intimate Surgeon that the Patient is ready for Procedure review? | Choose An Option ▼ | Message Center | | |
| | Would the assessment be reviewed and the data would flow to Page? | ☐ No | | | |
| | Where would the additional test/Lab results be reviewed? | Choose An Option ▼ | Perioperative Summary Page | | |

| Configuration | Questionnaire | Workflow Designer | Workflow Scripts | Data Collection Workbook | Metrics Window |

Anesthesia Module

Reference Pages

| Document Types | | | | | | |
|---|---|---|---|---|---|---|
| Document Type Name | Type | | Record Event Code | Printed Record Event Code | General Action Event Code | Surgical Areas | Doc Type (14258) |
| Anesthesia Record | Anesthesia | | Anesthesia Record Complete | Anesthesia Record | Anesthesia General Action | Labor and Delivery OR | Anesthesia Record - LD |
| | | | | | | Main OR | Anesthesia Record - OR |
| CV Log | CV Event Log | | | | | | |
| Other | Other | | | | | | |
| Sedation Record | Anesthesia | | Sedation Record Complete | Sedation Record | Anesthesia General Action | Cath Lab | |
| | | | | | | Endoscopy | Anesthesia Record - EN |

| Demographics | | | |
|---|---|---|---|
| Available Demographic Fields | Field Type | Caption | Selected or Required? |
| Anesthesia Record | | | |
| Age | Field | | Optional |
| Alerts | Field | | Optional |
| Allergies | Field | | Required |
| Anes. Type | Field | | Required |
| Anesthesia Reaction | Event Code | Anes. Reaction | Optional |
| Anesthesiologist | Field | Responsible Prov | Required |
| ASA Class | Field | | Optional |
| Body Mass Index Measured | Event Code | BMI | Optional |
| Case # | Field | | Optional |
| DOB | Field | | Optional |
| FIN NBR | Encounter Alias | | Optional |
| Gender | Field | | Optional |
| Height/Length Measured | Event Code | Height (cm) | Optional |
| Last Fluid Intake | Event Code | Last Fluid | Optional |
| Last Food Intake | Event Code | Last Food | Optional |
| Monitors | Field | | Optional |
| MRN | Field | | Optional |
| Name | Field | | Optional |

SYSTEM AND METHOD FOR OPTIMIZING DESIGN, WORKFLOWS, PERFORMANCE, AND CONFIGURATIONS BASED ON DESIGN ELEMENTS

INCORPORATION BY REFERENCE; DISCLAIMER

The following application is hereby incorporated by reference: application Ser. No. 17/201,086 filed on Mar. 15, 2021. The applicant hereby rescinds any disclaimer of claims scope in the parent application(s) or the prosecution history thereof and advise the USPTO that the claims in the application may be broader than any claim in the parent application(s).

BACKGROUND

When configuring the use and presentation of concepts information in a graphical user interface, a user is unable to view or visualize the downstream results of the configurations in the graphical user interface. Only after implementation of the configuration can a user experience the results of the configuration, such that unwanted results cannot be avoided in advance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for optimizing the graphical user interfaces and workflow of a target computer program being configured, that dynamically provides preview images, a workflow, test scripts, reference data, and performance predictions based on design element selections obtained through a questionnaire.

One aspect provides non-transitory computer-readable media having computer-executable instructions embodied thereon that, when executed, perform a method. In such an aspect, an indication of a plurality of design elements that are selected by a user is received. In response to the indication, a graphical user interface preview image that represents the plurality of design elements selected by the user is automatically displayed. A workflow that includes a plurality of steps is automatically generated, the plurality of steps being identified as corresponding to one or more of the plurality of design elements selected by the user. Further, a plurality of tests scripts are automatically generated, the plurality of test scripts being identified as corresponding to one or more of the plurality of steps. In aspects, a plurality of predicted performance indicators are calculated and automatically displayed, the plurality of predicted performance indicators being calculated from historical performance data associated with utilization of the plurality of design elements. In various aspects, the plurality of steps in the workflow, the plurality of tests scripts, and the plurality of predicted performance indicators are dynamically updated in near real-time based on one or more modifications subsequently made to the plurality of design elements selected by the user.

Another embodiment provides one or more non-transitory computer-readable media having computer-executable instructions embodied thereon that, when executed, perform a method. In aspects, an indication of a plurality of design elements selected by a user is received. A key that corresponds to the plurality of design elements selected by the user is matched to at least one graphical user interface preview image stored in a data base, in aspects. The at least one graphical user interface preview image is automatically displayed, the at least one graphical user interface preview image including visual representations of the plurality of design elements selected by the user. In aspects, the plurality of design elements selected by the user are mapped to a plurality of steps, the plurality of steps having one or more interdependencies and sequences. A workflow from the plurality of steps is automatically generated using the one or more interdependencies and sequences to arrange the plurality of steps to form the workflow. Additionally, a plurality of tests scripts is automatically generated, the plurality of test scripts being identified as corresponding to one or more of the plurality of steps of the workflow. In aspects, a plurality of predicted performance indicators are calculated based on a similarity of the workflow relative to one or more workflows of other users, and the plurality of predicted performance indicators are automatically displayed, the plurality of predicted performance indicators being calculated from historical performance data associated with utilization of, based on similarity to the workflow, the one or more workflows by the other users.

In another aspect, a system is provided. The system comprises one or more processors and an application. The application includes a graphical user interface module, a design manager module, a workflow module, a test script module, and a performance indicator module. Via the graphical user interface module, an indication of a plurality of design elements selected by a user is received. The designer manager module matches a key that corresponds to the plurality of design elements selected by the user to at least one graphical user interface preview image stored in a data base. The graphical user interface module then automatically displays the at least one graphical user interface preview image that includes visual representations of the plurality of design elements selected by the user. The workflow module maps the plurality of design elements selected by the user to a plurality of steps, the plurality of steps having one or more interdependencies and sequences. The workflow module then automatically generates a workflow from the plurality of steps using the one or more interdependencies and sequences to arrange the plurality of steps to form the workflow. In aspects, the test script module automatically generates a plurality of tests scripts, the plurality of test scripts being identified as corresponding to one or more of the plurality of steps of the workflow. The performance indicator module, in aspects, can calculate a plurality of predicted performance indicators based on a similarity of the workflow relative to one or more workflows of other users, as well. The graphical user interface module automatically causes display of the plurality of predicted performance indicators, the plurality of predicted performance indicators being calculated from historical performance data associated with utilization of, based on similarity to the workflow, the one or more workflows by the other users.

BRIEF DESCRIPTION OF THE DRAWINGS

Embodiments are described in detail below with reference to the attached drawings figures, wherein:

FIG. 5 depicts an initial GUI for accessing features of the system and methods discussed herein;

FIGS. 6A-C depict GUIs associated with the design element selection stage of the methods and system operations discussed herein;

FIGS. 8A-B depict GUIs associated with the design element selection stage of the methods and system operations discussed herein;

FIG. 10 depicts a GUI associated with a data collection stage of the methods and system operations discussed herein;

FIG. 11 depicts a GUI associated with a test script generation stage of the methods and system operations discussed herein;

DETAILED DESCRIPTION

Figure 1:
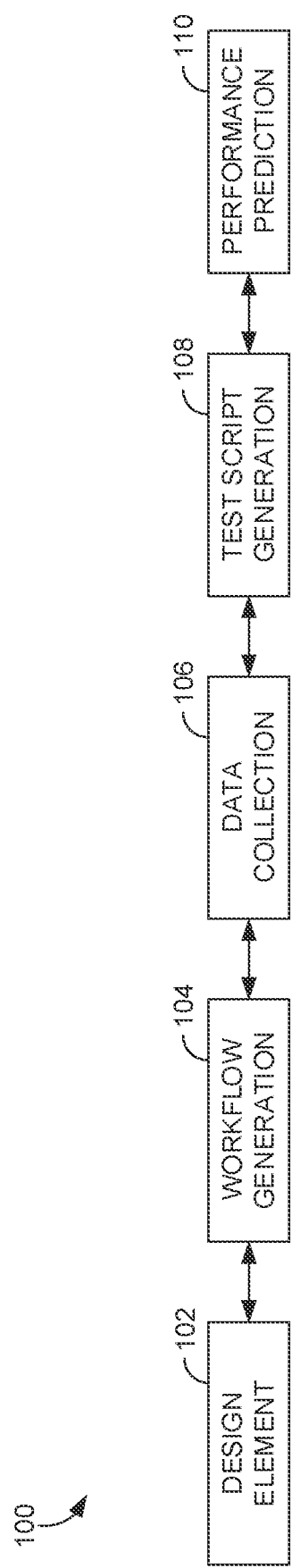
FIG. 1 depicts a flow chart of stages associated with the system and methods of aspects described herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

An application is provided herein that facilitates customization and configuration of a target computer program, specifically configuration of graphical user interfaces and a workflow for a target computer program. The application generates a questionnaire about design elements and/or workflow configurations for a specific target computer program. The user-input answers to the questions are used to automatically provide one or more preview images of one or more graphical user interface(s) of the target computer program to the user, wherein the preview images specifically visualize the result of the answers, as those answers relate to, correlated to, or defined one or more design elements and/or workflow steps specific to the target computer program. The workflow is specific to an entity or a particular client (e.g., business A, hospital B, physician group C), independent of the user and any relationship (e.g., employee, software engineer) with the entity or client. The preview images are automatically identified as matched to design elements selected via the answers of the questionnaire, and automatically displayed for the user. This creates an immediate review of the downstream results (e.g., in graphical user interface and workflow of the specific target computer program) so that a user can change one or more answers in the questionnaire to obtain another outcome.

Concurrently with the user entering answers about design elements and/or workflow configurations for a specific target computer program, the application automatically generates a workflow with specific steps that correspond to the design element selections from the answers. Further, the application automatically identifies test scripts that can be used to test the workflow that is generated, and identifies reference data that is usable for implementation of the workflow in the specific target computer program. Additionally, the application automatically calculates predicted performance indicators for the specific target computer program, as configured based on the workflow generated and the design element selections from the answers. The workflow, the test scripts, the reference data, and the predicted performance indicators are each being dynamically updated by the application in near real-time, as a user inputs an answer to a question in the questionnaire. For each answer input, each selection, each de-selection, each modification to an answer, the application updates the workflow, the test scripts, the reference data, and the predicted performance indicators in near real-time. Further, the application provides multiple concurrent accessible graphical user interfaces so that a user can navigate easily back and forth between viewing the questionnaire with previews images for the target computer program, the workflow, the test scripts, the reference data, and the predicted performance indicators.

FIG. 1 depicts a flow chart of stages 100 associated with the system and methods of aspects described herein. In FIG. 1, examples of stages include a design element selection stage 102, a workflow generation stage 104, a data collection stage 106, a test script generation stage 108, and a performance prediction stage 110. Generally, the stages 100 represent one or more system operations and methods discussed hereinafter. While the stages 100 form a loose sequence from left to right, the order of the stages 100 representing system operations and methods are not fixed and may be reordered as indicated by the bidirectional arrows. In one example, system operations and methods associated with a design element selection stage 102 do not need to be completed before system operations and methods associated with each of the workflow generation stage 104, a data collection stage 106, a test script generation stage 108, and a performance prediction stage 110 are performed. Instead, system operations and method steps associated with one stage are dynamic and reactive to system operations and method steps associated with another stage, for example, such that the various stages include concurrently performed operations and method steps. In one example, system operations and method steps associated with the design element selection stage 102 impact and trigger other system operations and method steps associated with one or more of the workflow generation stage 104, the data collection stage 106, the test script generation stage 108, and/or the performance prediction stage 110; however, aspects and input in the design element selection stage 102 need not be fully completed to update and trigger actions with regard to the workflow generation stage 104, the data collection stage 106, the test script generation stage 108, and/or the performance prediction stage 110. As such, the sequence or ordering shown in FIG. 1 is merely an example for visualizing and grouping system operations and method steps further discussed herein. It will be understood from this description that the system operations and method steps are dynamically responsive to one another, enabling shuffling of the system operations and method steps associated with each of the stages shown. As such, the design element selection stage 102, the workflow generation stage 104, the data collection stage 106, the test script generation stage 108, and the performance prediction stage 110 may be referred to hereinafter when discussing system operations and method steps of other figures. Further, it will understood that each of the stages referenced above generally corresponds to one or more operations performed by the application described hereinafter, with regard to, respectively, a design manager module, a workflow module, a data collection module, a test script module, a performance indicator module, and a graphical user interface module, each of which is involved in the system of FIG. 2.

Figure 2:
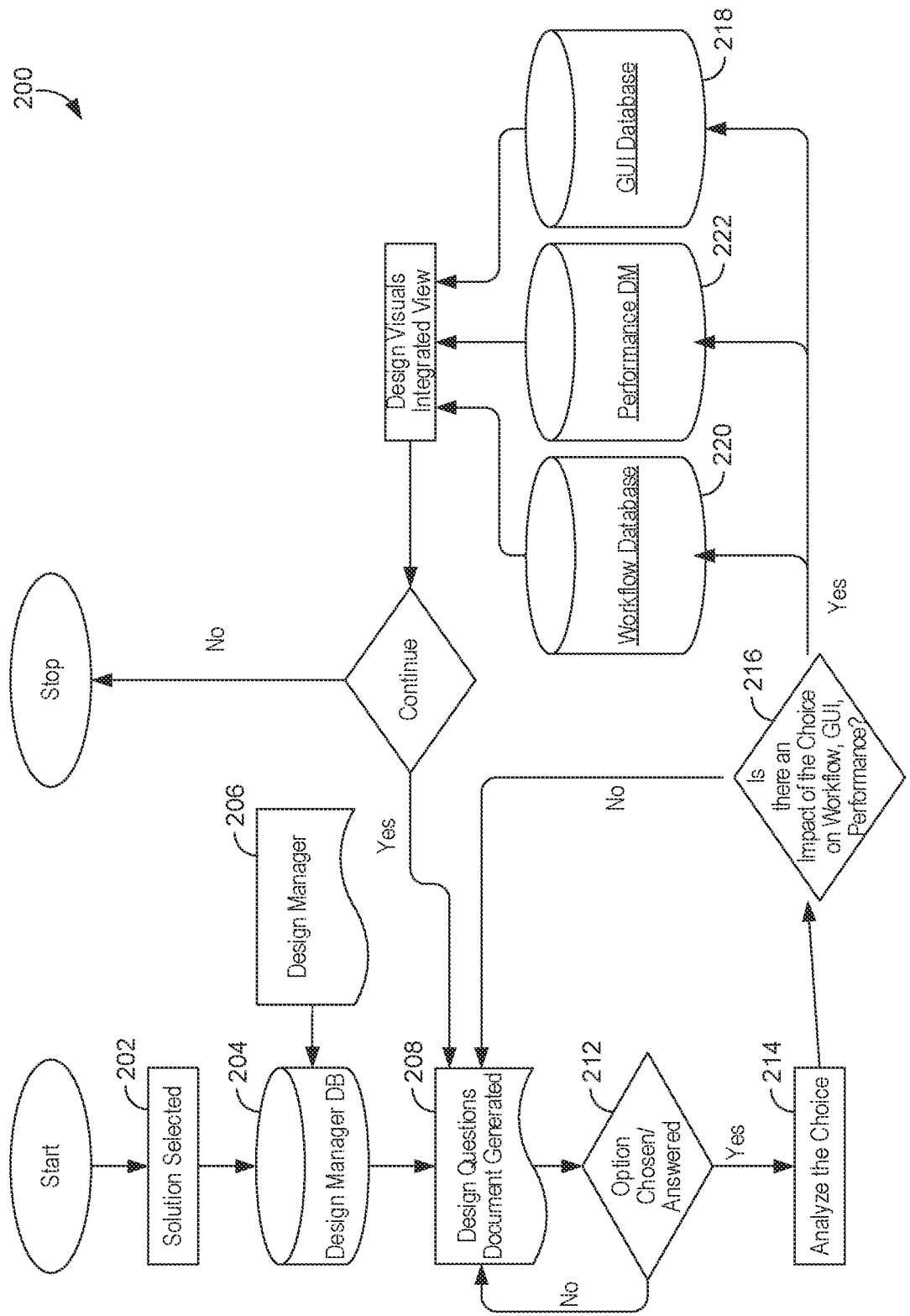
FIG. 2 depicts a flowchart for a system for optimization of the graphical user interfaces and workflow within a target computer program, in accordance with aspect described herein.

FIG. 2 depicts a flowchart for a system 200, in accordance with aspect described herein. The system 200 comprises one or more processors and an application for optimization of the graphical user interfaces and workflow within a target computer program. An "application" refers to software and/or hardware that store computer executable instructions in a computer programming language, which when executed, result in an application that performs functions, operations, and/or computerized methods. The application includes a design manager module, a workflow module, a data collection module, a test script module, a performance indicator module, and a graphical user interface module, each of which is involved in the flowchart of the system 200 of FIG. 2. As such, the system 200 may be considered an application or an algorithm-controlled analytics module that incorporates, oversees, or is the aggregate of the design manager module, the workflow module, the data collection module, the test script module, the performance indicator module, and the graphical user interface module. It will be understood that the terms "start" and "stop" shown in FIG. 2 are not intended to and do not necessarily refer to definitive initialization and definitive termination of the application, as the example communications and operations of the application that are shown can be repeated for multiple instances of selections, and further, the application can be relaunched, closed, and/or otherwise reused.

As shown in FIG. 2, a solution may be input and/or selected (e.g., solution selected 202). Generally, one or more user inputs may be used to identify and determine which one or more specific design questionnaire/elements are to be displayed for user selection in a graphical user interface. For example, user inputs may specify a client name and/or mnemonic, a target computer program (also referred to as a "solution") for which design elements are to be selected by the user, one or more previous configurations for the target program utilized by the client, and the like. FIG. 5 presents an initial GUI 500 for accessing features of the system and methods discussed herein. In FIG. 5, user inputs may specify a client name and/or mnemonic, a target computer program (also referred to as a "solution") for which design elements are to be selected by the user, one or more previous configurations for the target program utilized by the client. The initial GUI 500 requires that a target computer program be selected, but optionally allows entry of additional user inputs.

Based the solution that is selected (e.g., solution selected 202) and received by the system 200 and application, information that is specific to the target computer program is automatically identified and retrieved from a design manager database 204, which may be populated from a front end design manager 206. In further aspects, information that is specific to the target computer program as well as the client and/or one or more previous configurations for the target program may be automatically identified and retrieved from the design manager database 204. The information may include one or more questions that correspond to design elements of the graphical user interfaces within the target computer program. In some aspects, information is used to generate one or more questions that correspond to design elements of the graphical user interfaces and workflow within the target computer program (e.g., design questionnaire generated 208), as shown in FIG. 2.

The one or more questions can then be presented, via a graphical user interface of the application, as a questionnaire for user selection in optimizing the graphical user interface of the target computer program. FIGS. 6A-C depict GUIs 600 associated with the design element selection stage of the methods and system operations discussed herein. As shown in the example of FIG. 6A, a plurality of questions is presented as a questionnaire, through which a user can scroll, and respond with selections, also referred to as "answers." In various aspects, one question may correspond to one design element or one question may correspond to multiple design elements, such that each question may correspond to any quantity of design elements for the graphical user interfaces within the target computer program. However, while one or more question(s) may correspond to design element(s), each question may be a statement that inquires a user about workflow steps wherein that workflow step results in design element changes. For example, "Do you perform pre-admission testing" 602 is displayed in FIG. 6A that indirectly targets design element(s) in the graphical user interface(s) of the target computer program to be optimized. In some instances, one or more question(s) may correspond to design element(s) and may inquire directly about the design element(s). For example, a question such as "Will Consent be displayed on Page" 604 is a question displayed in FIG. 6A that directly targets design element(s) in the graphical user interface(s) of the target computer program to be optimized.

Each question may be sorted under one or more categories, for example, "Anesthesia Patient Demographics" 606 and "Pre-Admission Testing (PAT)" 608 as shown in FIG. 6A-B. Each question has a selectable option, which represents an answer to the question. The selectable option may be used by a user to indicate whether the design element corresponding to that question has been answered, for example, by selecting a check box to change "No" 610 to "Yes" 612. In another example, the selectable option may be chosen by a user from a drop-down menu of one or more characteristics for that design element, such as selection of "Pre-anesthesia Note" option. Each question in the questionnaire may include one or more default options, in some aspects. In aspects, a recommendation can be generated and displayed for one or more of the questions in the questionnaire, for example, to recommend whether the answer for a particular question for a design element should be a selection (e.g., "Yes"), deselection (e.g., "No"), and/or other characteristic (e.g., "Y" as a recommended answer of Yes, under the column "Model Rec.").

Further, by answering one or more of the questions in the questionnaire, additional questions may be automatically generated and displayed to prompt the user to answer this subset of questions. For example, in FIG. 6A, the question "Do you want to change the patient demographics values?" 614 is shown with the answer "No" 610 indicated by the unchecked box in the same row as said question. When the question "Do you want to change the patient demographics values?" 614 is shown with the answer "Yes" 612 in FIG. 6B, based on a user checking the box in the same row as said question, additional questions 616 may be automatically generated and displayed to prompt the user to answer such a subset of questions, as shown in FIG. 6C. A plurality of new questions are displayed as nested below the question "Do you want to change the patient demographics values?" 614 in FIG. 6C, in response to and/or as a result of the answer to said question being changed from "No" 610 to "Yes" 612.

When a question is answered, an indication may be generated and received by system 200, wherein the indication reflects one or more design element(s) selections corresponding to the answer to the question. In various aspects, via the graphical user interface module of the application, an indication is received that indicates or specifies one or more design elements that have been selected by a user, by way of the answer to a question. For example, an indication is received that one or more particular design elements are selected, based on one or more answers to one or more of the questions in the displayed questionnaire, as shown in FIG. 2 (e.g., "Option Chosen/Answered" 212). Based on the indication, the one or more answers to one or more of the questions in the displayed questionnaire are analyzed (e.g., "Analyze the Choice" 214) to determine whether the specific answer to the particular question impacts one or more of a graphical user interface in the target computer program, a workflow utilized in the target computer program, and/or one or more performance indicators (e.g., "Is there an Impact of the Choice on Workflow, GUI(s), Performance?" 216). If the one or more of the answers do not impact any graphical user interfaces in the target computer program, the workflow utilized in the target computer program, and the performance indicators, no user-visible action is taken by the application of the system 200. If the one or more of the answers does impact any graphical user interfaces in the target computer program, the workflow utilized in the target computer program, and/or the performance indicators, the application of the system 200 determines to take an action.

In various aspects, the design manager module of the application determines the particular permutation of the one or more answers for the specific question(s). In such aspects, the design manager module of the application can match a key and/or a combination of keys that corresponds to the plurality of design elements selected by the user to at least one graphical user interface preview image stored in a database. In one example, the design manager module can match the keys that correspond to the answers (e.g., each answer may correspond to one key) to one preview image stored in the GUI database 218 of FIG. 2. The one preview image may be stored in association with one or more keys, and the one or more keys can be identical to the one or more keys of the answers to the questions that correspond to design element(s) to be optimized in the target computer program. In another example, the design manager module can match the keys that correspond to the answers (e.g., each answer may correspond to one key) to a plurality of preview images stored in the GUI database 218. Each of the plurality of preview images may be stored in association with a unique key that can be matched as identical to one of the answers to the questions that correspond to design element(s) to be optimized in the target computer program. The application may, via the graphical user interface module, automatically cause display of the at least one graphical user interface preview image, the at least one graphical user interface preview image including visual representations of the plurality of design elements selected by the user. As such, the one or more graphical user interface preview image(s) are displayed in response to the answers to the questions. The preview image(s) provide a visual preview that shows the resulting design element(s) for the particular answer(s) provided to the specific question(s). Further, for each instance that an answer to a question in the questionnaire is input and/or changed, one or more graphical user interface preview image(s) are displayed that provide a visual preview showing the resulting design element(s) for the particular answer(s) provided to the specific question(s). With each answer, the resulting design element is automatically provided as a preview of the graphical user interface for the targeted computer program being optimized.

Figure 7A:
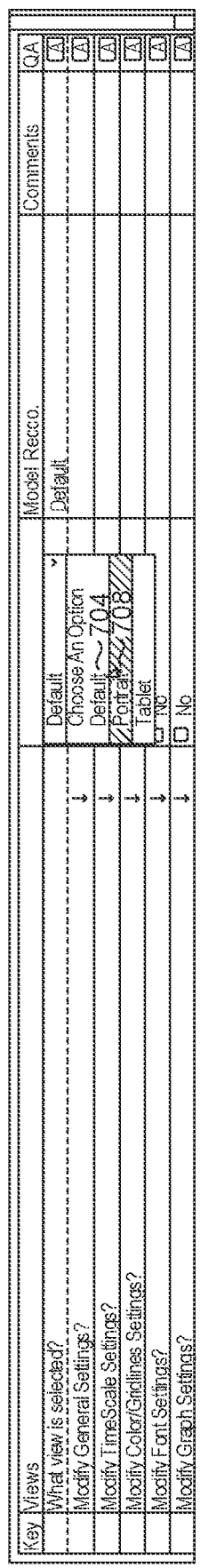
FIGS. 7A-C depict GUIs associated with the design element selection stage of the methods and system operations discussed herein.
Figure 7B:
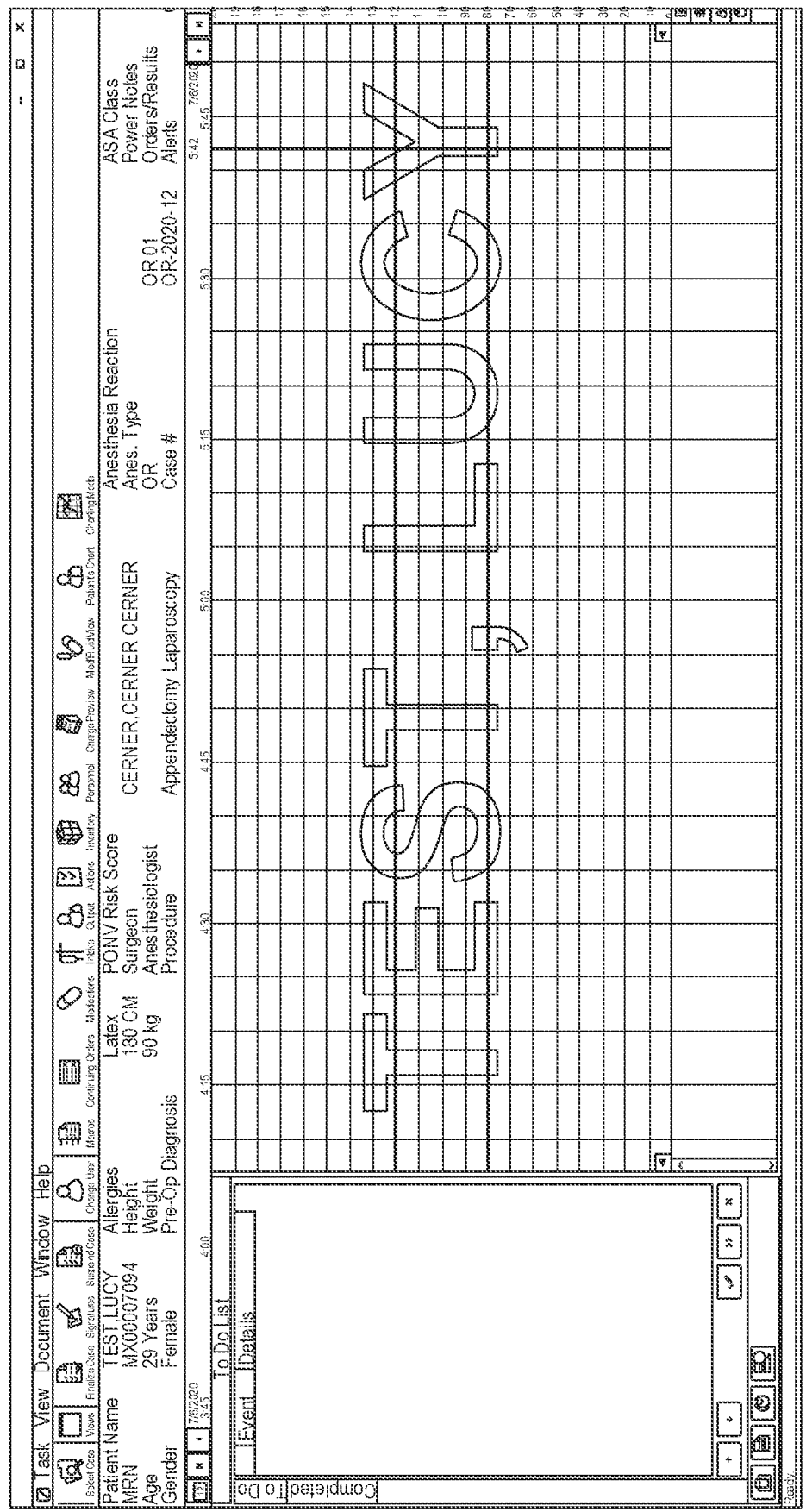
Figure 7C:
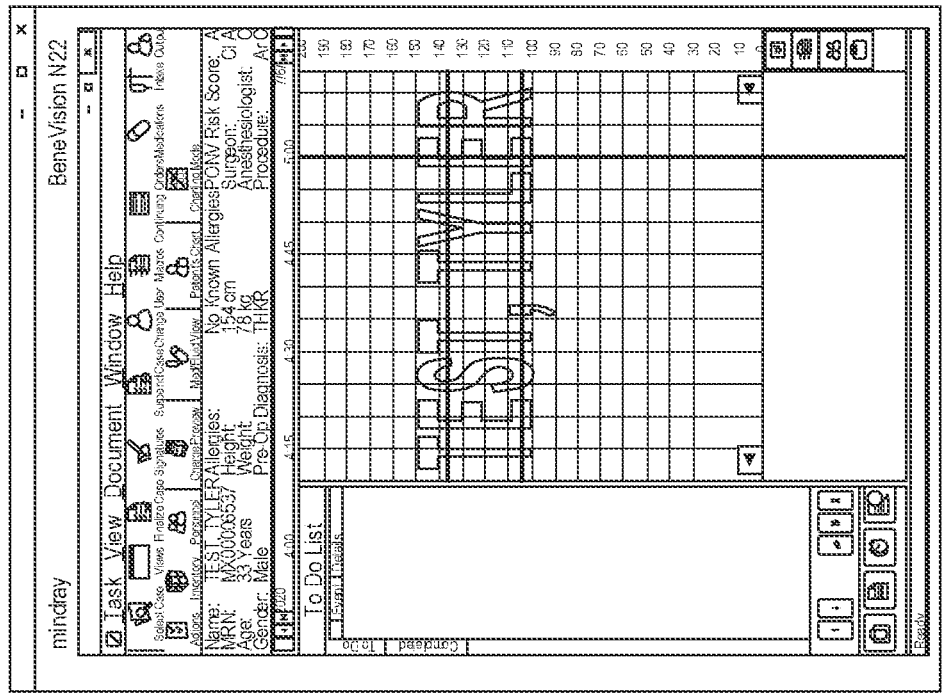

For example, FIGS. 7A-C depicts GUIs 700, 702, and 706 associated with the design element selection stage of the methods and system operations discussed herein. In FIG. 7A, a user selection of a particular design element option is input as an answer to a question in the questionnaire, wherein the answer is one of many options, such as a default view. Automatically, and in response to this answer/selection, a preview of the graphical user interface provides a visual preview showing the resulting design element(s) for the particular answer(s) provided to the specific question(s). For example, FIG. 7B depicts an example of a graphical user interface preview image 702 that shows the resulting design element for the particular answer "default view" 704 provided to the specific question in FIG. 7A. A user may close the graphical user interface preview image to return directly back to the questionnaire, in aspects. In such an example, FIG. 7C depicts an example of another graphical user interface preview image 702 that shows the resulting design element for the particular answer "portrait view" 708 provided to the specific question shown FIG. 7A. In this manner, a user can change their answer(s) to question(s) to automatically be provided with a preview of the graphical user interface preview image showing the resulting design element that reflects their answer(s) to question(s).

Figure 8B:
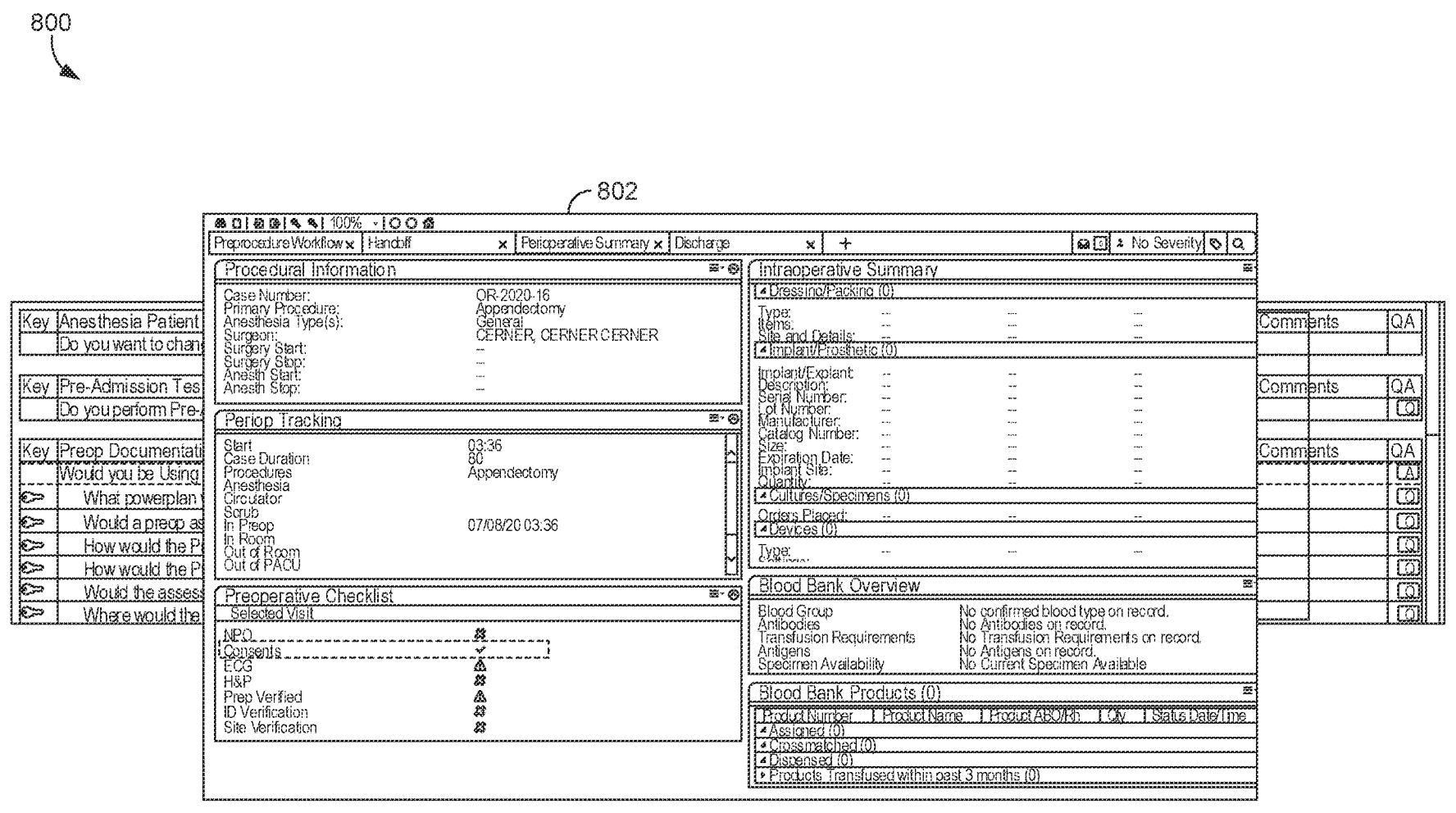

In some aspects the graphical user interface preview image is automatically displayed overlaying the questionnaire. For example, FIGS. 8A-B depict GUIs 800 associated with the design element selection stage of the methods and system operations discussed herein. FIG. 8A depicts an example where a user selects a particular design element option by answering a question in the questionnaire, and FIG. 8B depicts the graphical user interface preview image 802 that shows a resulting design element for a particular answer for a question shown. In FIG. 8B, the preview image is displayed overlaying the questionnaire, such that the user does not need to navigate between screens, windows, tabs, etc., in order to see the design elements results from the answer input for a particular question. The user can close the overlaying preview image to immediately return to the questionnaire.

Continuing with the system of FIG. 2, in addition to determining whether one or more of the answers impacts the graphical user interface(s) of the target computer program, the application also determines whether the one or more answers impact the workflow utilized in the target computer program. When an indication is received that reflects one or more design element(s) selections corresponding to the answer to the question, it is determined whether the answer to the question impacts the workflow utilized in the target computer program, for example, by having the workflow module of the application query the workflow database 220 of FIG. 2. The workflow module may query the workflow database 220 to identify steps and to sequence a workflow for the targeted computer program, wherein the steps and sequence identified are determined in a manner that reflects and/or or accounts for the one or more design element(s) selections corresponding to the answer to the question. In some aspects, the workflow module maps one or more design elements selected by the user (by answering questions) to a plurality of steps, wherein the plurality of steps have one or more interdependencies and/or sequences relative to each other. For example, a particular answer to one question may correspond to a design element being selected, wherein that design element would, in the target computer program, prompt a user to navigate to another window by clicking a particular button. As such, design elements influence, impact, and/or can control and dictate workflows in the target computer program. Each selected design element can be mapped to one or more steps in one or more workflows, and the interdependencies between steps can be predefined such that the sequence of particular steps impacted by the design element can be identified by the workflow module.

Figure 9:
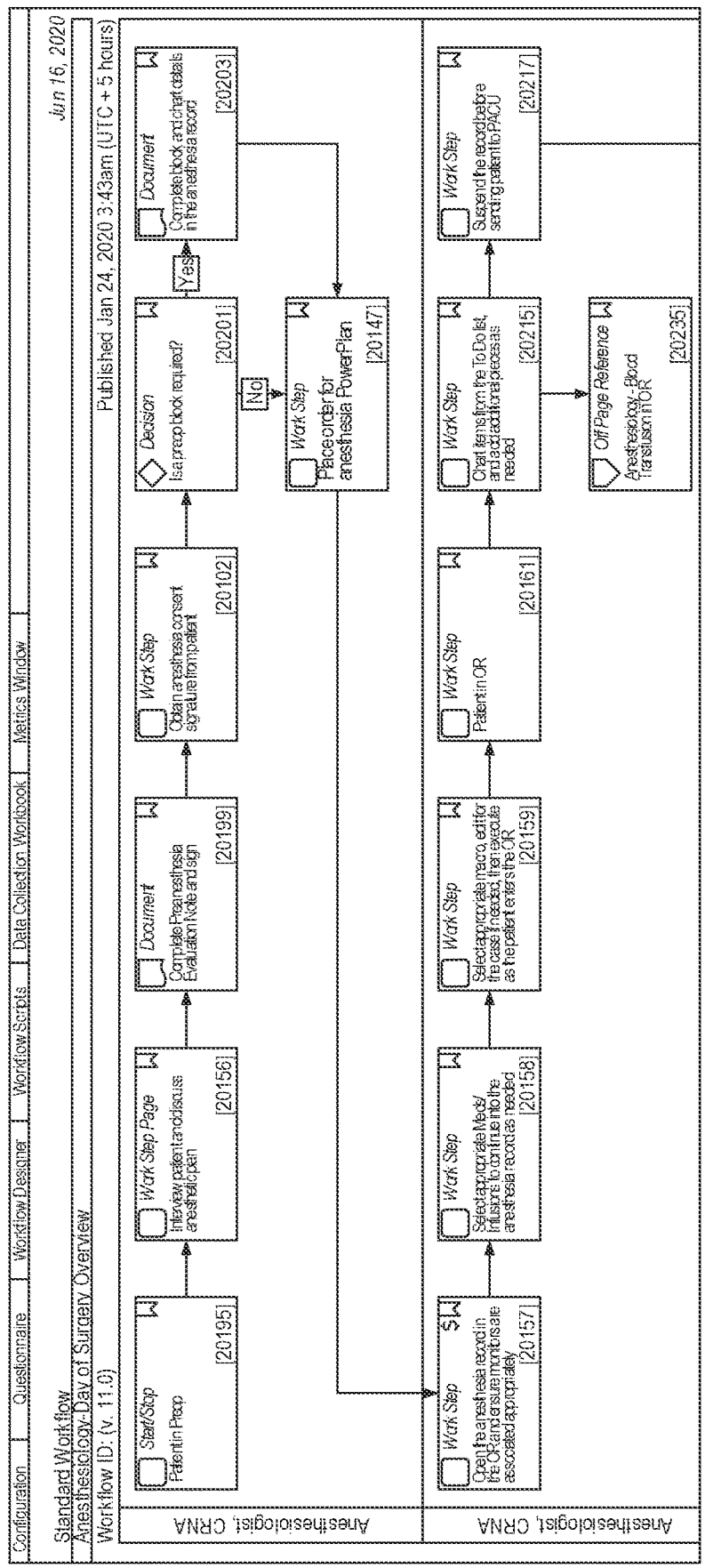
FIG. 9 depicts a GUI associated with a workflow generation stage of the methods and system operations discussed herein.

The workflow module can automatically generate a workflow from the plurality of steps identified, wherein the workflow generated uses the one or more interdependencies and sequences to arrange the plurality of steps to form the workflow. For example, FIG. 9 depicts a GUI associated with the workflow generation stage of the methods and system operations discussed herein. As shown in the example of FIG. 9, a workflow 900 having multiple steps in a particular sequence has been generated by the workflow module of the application, wherein the steps and workflow reflect design elements selected by the user (by answering questions) to a plurality of steps, as well as one or more interdependencies and/or sequences between the steps. Notably, each instance that a user provides a new answer and/or changes an answer in the questionnaire, the workflow module dynamically updates the workflows and steps therein as needed, to reflect design element changes resulting from the new answer and/or changes to the answer in the questionnaire. Based on the workflow (and inherently at least some portion of the user selected design elements), the data collection module of the application can determine a limited data set of client data to request for the targeted computer program. For example, FIG. 10 depicts a GUI 1000 associated with the data collection stage of the methods and system operations discussed herein. The data collection module can identify specific categories of data to collect, wherein the categories are identified based on the workflow and steps identified for the workflow module, which is generated based on the selected design elements from the questionnaire. The data collection module can identify, in a model domain, a first portion of reference data that corresponds to one or more of the plurality of design elements selected by a user and/or one or more of the plurality of steps in the workflow generated. The data collection module can communicate with the graphical user interface module to cause automatic display of the reference data identified, for example, in a new window or under a separate tab in the application. Generally, in aspects, a remainder portion of reference data in the model domain is not presented as not corresponding to the one or more of the plurality of design elements.

Figure 11:
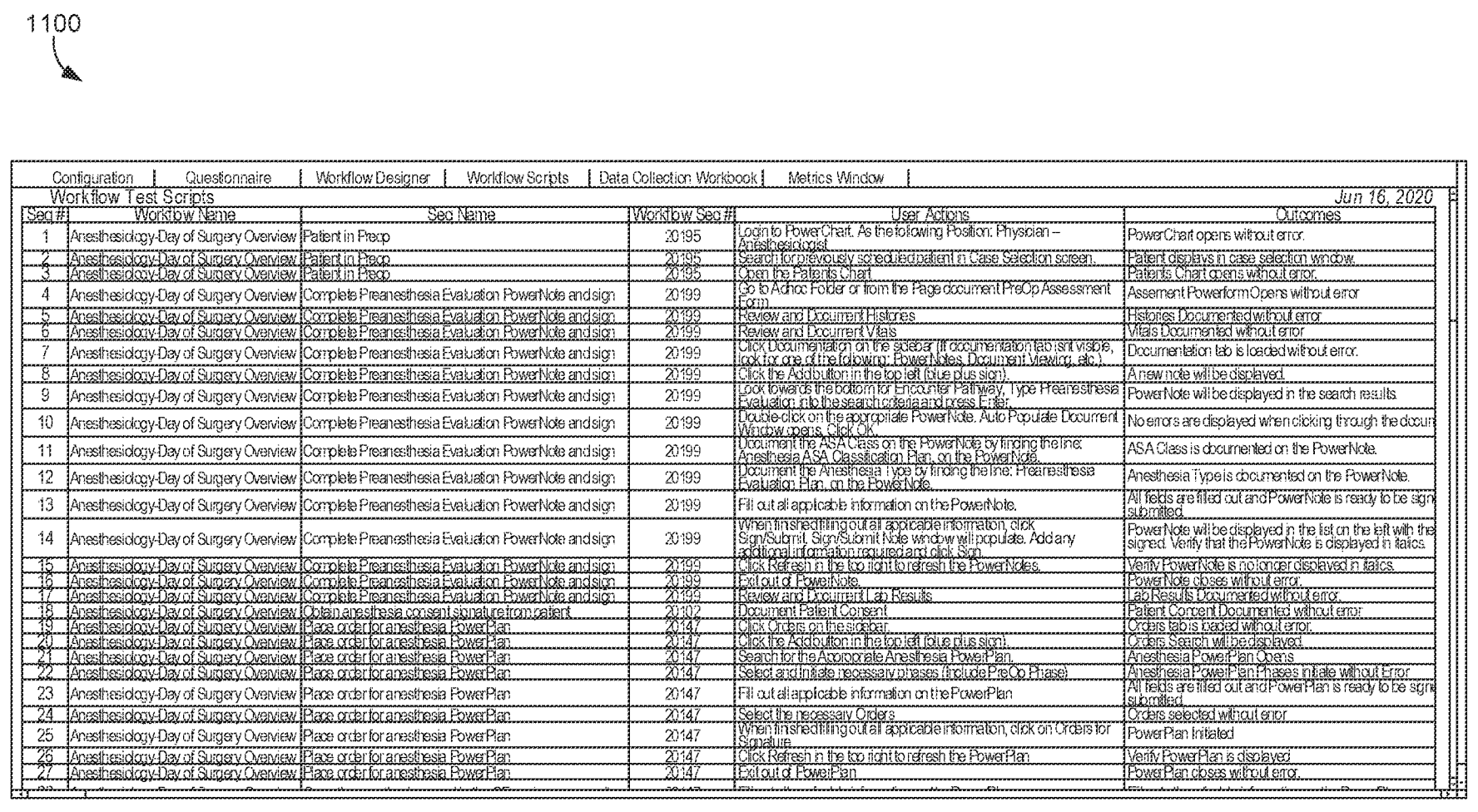

Continuing, based on the workflow that is generated (and inherently at least some portion of the user selected design elements), the test script module of the application can query a database, such as the workflow database 220 of FIG. 2 to locate one or more test scripts for testing the workflow. In some aspects, the test script module automatically generates a plurality of tests scripts that are identified as corresponding to one or more of the plurality of steps of the workflow. For example, one or more test scripts may be identified for each step in the workflow, so that the test scripts can be executed to test the workflow of the target computer program being optimized. To illustrate, FIG. 11 depicts a GUI 1100 associated with the test script generation stage of the methods and system operations discussed herein. In FIG. 11, each workflow sequence identifier that corresponds to a step in the workflow can be used to identify one or more test scripts that specifically test one or more aspects of that particular step in the workflow. Test scripts may be identified for the entire workflow, in aspects. Additionally or alternatively, one or more test scripts may be identified for each design element selected or defined based on the answers of the questionnaire, so that the test scripts can be executed to test one or more functionalities impacted by the design elements selected or defined for the target computer program being optimized. For example, one or more answers to one or more questions may specify a design element, where that design element "turns on" a functionality (e.g., a button, an icon) in a graphical user interface of the target computer program. In such an example, one or more tests scripts are identified in a database that specifically test the functionality that is "on" based on the selected design element.

Figure 12A:
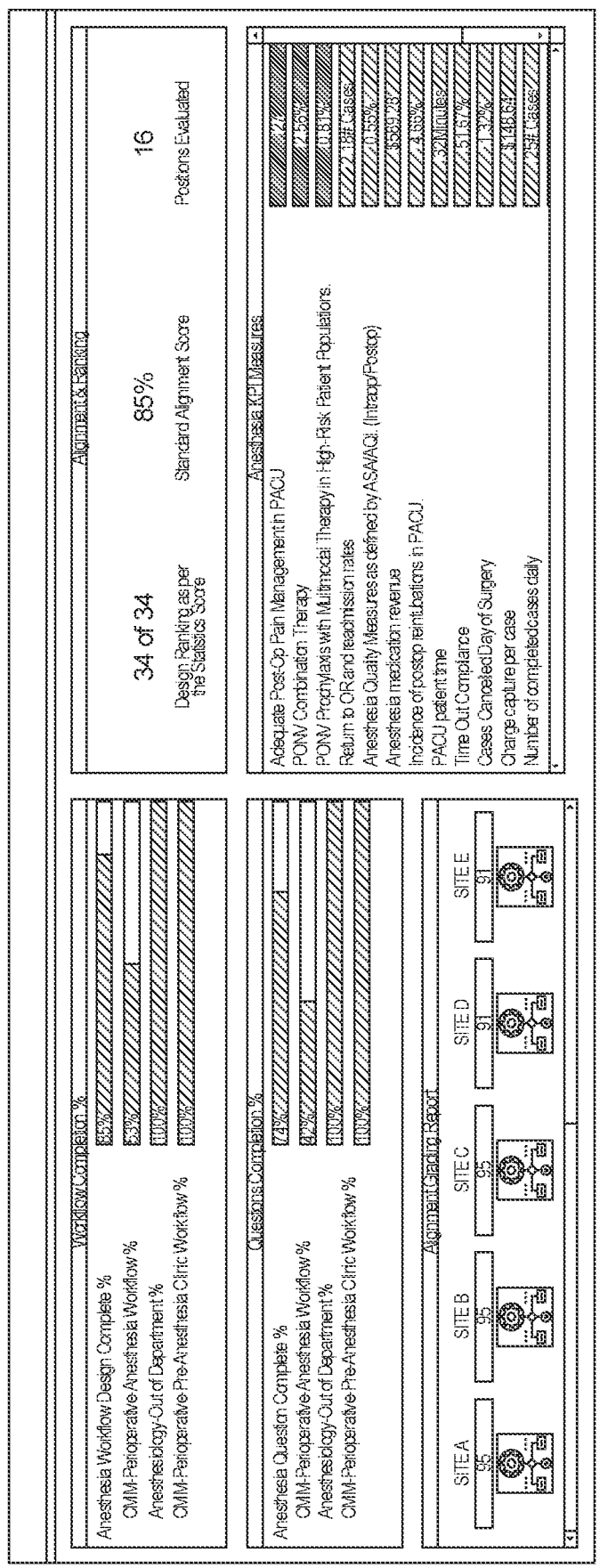
FIGS. 12A-B depict GUIs associated with a performance indication prediction stage of the methods and system operations discussed herein.
Figure 12B:
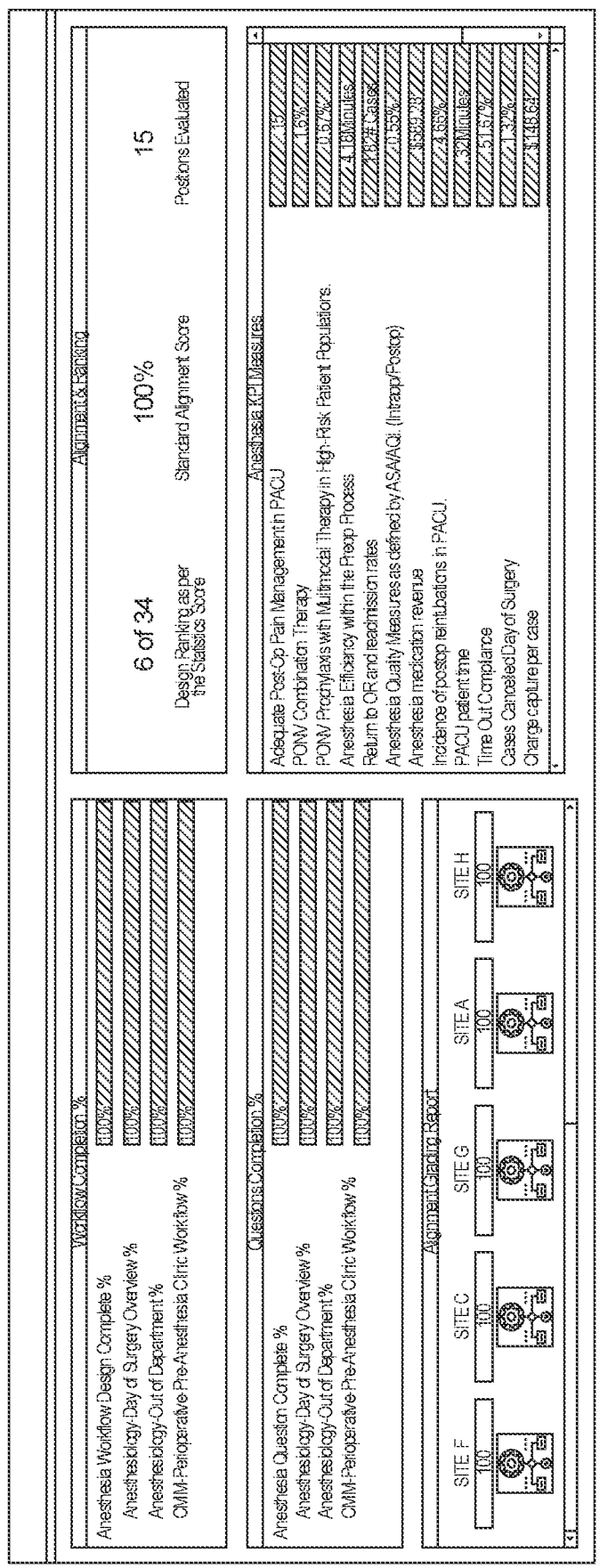

In addition to determining whether one or more of the answers impacts the graphical user interface(s) and/or the workflow utilized in the target computer program, the application determines whether the answers impact performance indicators. For example, the performance indicator module of the application can query the performance data model 222 of FIG. 2. The performance data model 222 may be a model that utilizes historical performance data captured for other design elements and workflows of other clients. The performance indicator modules can calculate a plurality of predicted performance indicators based on a similarity of the workflow relative to one or more prior workflows of other users. The graphical user interface module can automatically display the plurality of predicted performance indicators that were calculated. The plurality of predicted performance indicators may be calculated using a data model that leverages historical performance data associated with utilization of, based on similarity to the workflow, the one or more workflows by the other users. The calculated performance indicators may be displayed in a new window or under a separate tab in the application. For example, FIGS. 12A-B depicts GUIs 1200 associated with the performance indication prediction stage of the methods and system operations discussed herein. In the GUI of FIG. 12A, a plurality of performance indicators that were calculated from historical performance data of others' workflows and/or others' design elements are displayed as predictions for the generated workflow and/or the current design elements selected by a user, by way of the current answers input to the questionnaire. This provides a prediction "preview" of how the targeted computer program is expected to perform based on the generated workflow and/or the current design elements selected by a user.

For each instance that a user provides a new answer and/or changes an answer in the questionnaire, the performance module dynamically re-calculates the performance indicators, to reflect design element changes resulting from the new answer and/or changes to the answer in the questionnaire. In this manner, the impact of various design elements can be displayed for consideration, and further, one or more design elements can be selected via the questionnaire to improve one or more specific performance indicators in the targeted computer program being optimized. For example, in the GUI of FIG. 12B, the performance indicators being displayed have been dynamically and automatically updated to reflect a new answer and/or changes to an answer in the questionnaire.

Figure 3:
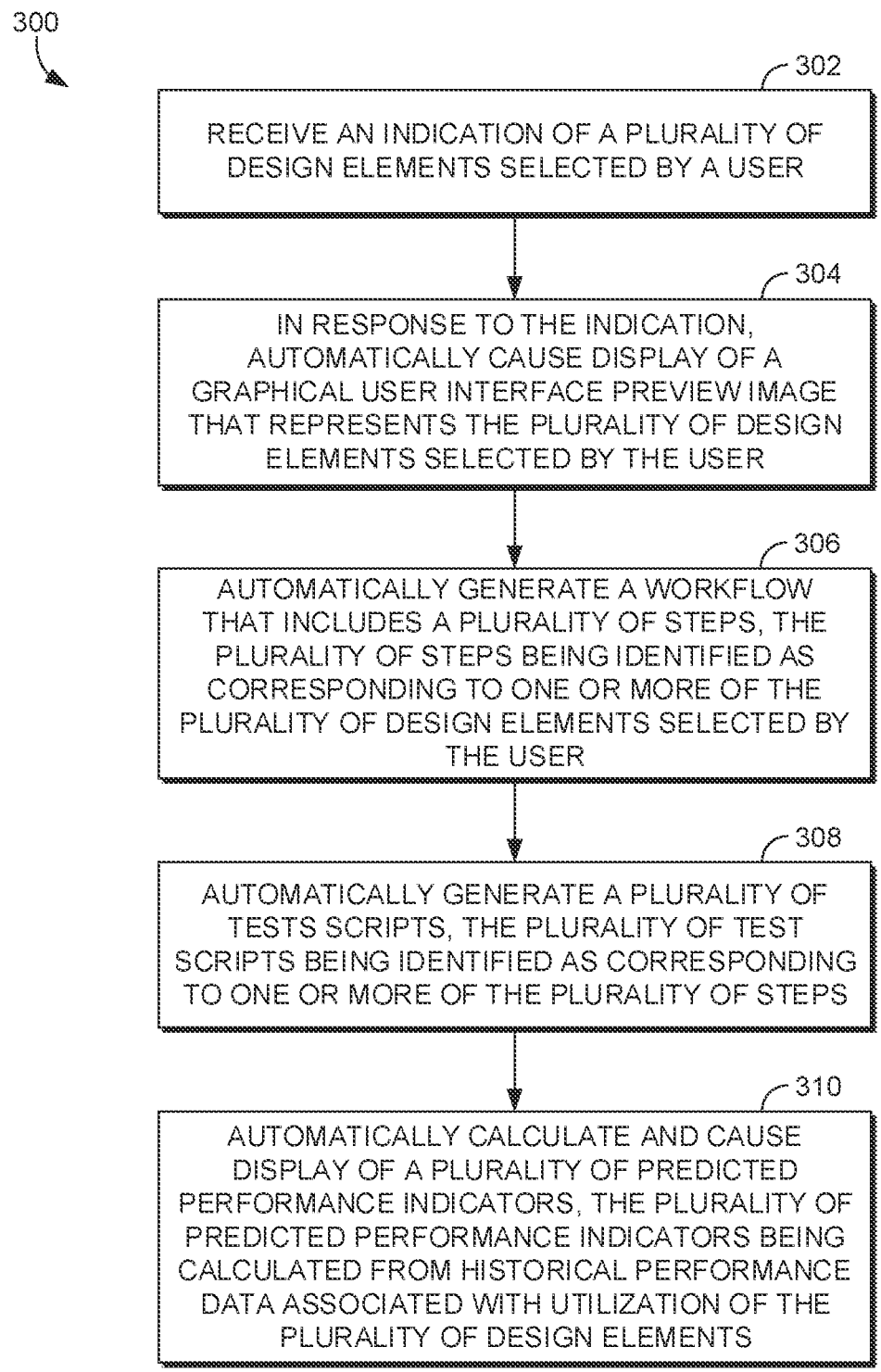
FIG. 3 depicts a flowchart of a method for optimization of the graphical user interfaces and workflow within a target computer program, accordance with aspect described herein.
Figure 4:
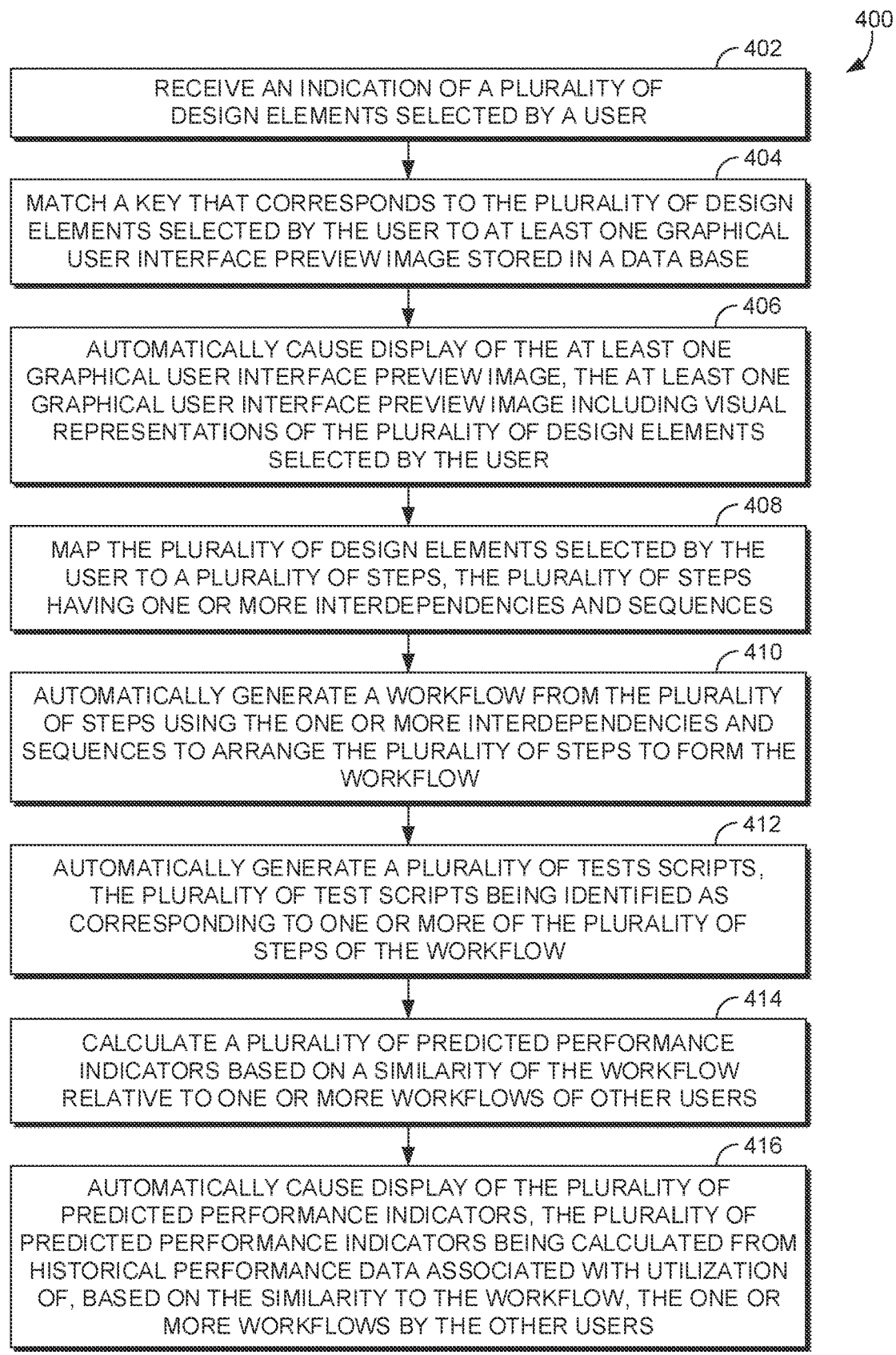
FIG. 4 depicts a flowchart of another method for optimization of the graphical user interfaces and workflow within a target computer program, accordance with aspect described herein.

Turning now to FIGS. 3-4, methods are discussed that can be performed via one or more of the components and component interactions previously described in FIGS. 1-2. As such, the methods are discussed briefly for brevity, though it will be understood that the previous discussion and details described therein can be applicable to aspects of the methods of FIGS. 3-4. Additionally or alternatively, it will be understood that the methods discussed herein can be implemented or performed via the execution of computer-readable instructions stored on computer-readable media, by one or more processors. The methods herein may be computer-implemented methods, in some aspects. In various aspects, one or more non-transitory computer-readable storage medium having computer-readable program code portions embodied therein are used to implement the methods. For example, the computer-readable program code portions may include one or more executable portions configured to perform one or more of the methods. The computer-readable program code may correspond to one or more modules of the application, described above, wherein the application performs the methods, in some aspects.

FIG. 3 depicts a flowchart of a method 300 for optimization of the graphical user interfaces and workflow within a target computer program, accordance with aspects described herein. At block 302, an indication of a plurality of design elements selected by a user. It should be understood that each of the design elements can be individually selected, based on the answers provided to the questionnaire. As such, one answer may result in the selection of several design elements or just one design element, for example. In some aspects, the indication is received via a graphical user interface module of the application of FIG. 2. In response to receiving the indication, a preview graphical user interface is automatically caused to be displayed, wherein the preview graphical user interface represents the plurality of design elements, shown at block 304. In some aspects, the graphical user interface preview image(s) is/are identified as specifically corresponding to the plurality of design elements selected by the user. As such, the graphical user interface preview image(s) are identified and selected for display from a plurality of graphical user interface preview images stored in a database. Each of the plurality of graphical user interface preview images stored in the database may visually represent a distinct permutation of various design elements that are available for selection by a user. In some aspects, a design manage module and/or a graphical user interface module of the application of FIG. 2 facilitate identifying a specific preview graphical user interface of the target computer program that corresponds to the plurality of design elements selected by a user, as previously described, which can be displayed within the application in response to a user's answers to questions in the questionnaire.

At block 306, a workflow is automatically generated that includes a plurality of steps, the plurality of steps being identified as corresponding to one or more of the plurality of design elements selected by the user. In some aspects, the workflow module of the application of FIG. 2 facilitates generation of the workflow, as previously described. In the method 300, a plurality of tests scripts are automatically generated, the plurality of test scripts being identified as corresponding to one or more of the plurality of steps, as depicted in block 308. In aspects, the test scripts module of the application of FIG. 2 facilitates the generation of test scripts that are usable to test the particular workflow generated from the selected design elements identified from the questionnaire, as previously described. At block 310, a plurality of predicted performance indicators are automatically calculated and displayed, the plurality of predicted performance indicators being calculated from historical performance data associated with utilization of the plurality of design elements. In various aspects, the performance indicator module of the application of FIG. 2 facilitates calculation of the performance indicators for the plurality of design elements selected by a user based on historical performance data associated with utilization of the plurality of design elements, as previously described.

Generally, the plurality of steps in the workflow, the plurality of tests scripts, and the plurality of predicted performance indicators are dynamically updated in near real-time based on one or more modifications made to the plurality of design elements selected by the user, in accordance with the method 300. Additionally, the method 300 may identify, in a model domain, a first portion of reference data that corresponds to one or more of the plurality of design elements selected by a user and/or one or more of the plurality of steps in the workflow generated, for each instance of an indication that is received. The data collection module can communicate with the graphical user interface module of FIG. 2, for example, to cause automatic display of the reference data identified, for example, in a new window or under a separate tab in the application. Generally, in aspects, a remainder portion of reference data in the model domain is not presented as not corresponding to the one or more of the plurality of design elements.

For example, when one or more modifications are made to one or more answers in the questionnaire, it acts as a modification to the design elements that corresponds to one or more of the questions. These one or more modifications made to the plurality of design elements may include an addition of a new design element to the plurality of design elements selected by the user. In one such example, the plurality of steps in the workflow, the plurality of tests scripts, and the plurality of predicted performance indicators are dynamically updated in near real-time in response to the new design element added to the plurality of design elements selected by the user. In another example, when one or more modifications made to the plurality of design elements includes the removal of one of the plurality of design elements selected by the user, the plurality of steps in the workflow, the plurality of tests scripts, and the plurality of predicted performance indicators are dynamically updated in near real-time in response to removal of one of the plurality of design elements selected by the user. In yet another example, one or more modifications are made to the plurality of design elements that include a change to a characteristic of one of the plurality of design elements selected by the user. In such an example, the plurality of steps in the workflow, the plurality of tests scripts, and the plurality of predicted performance indicators are dynamically updated in near real-time in response to the change to the characteristic of one of the plurality of design elements selected by the user. It should be understood that, when one or more modifications include a combination of an addition and a removal of different design elements, for example, the plurality of steps in the workflow, the plurality of tests scripts, and the plurality of predicted performance indicators are dynamically updated in near real-time in response to account for both the addition and the removal. As such, any change or combination of changes that may be made in the questionnaire are used by the application to dynamically and automatically update the plurality of steps in the workflow, the plurality of tests scripts, and the plurality of predicted performance indicators, in near real-time. As such, each modification can be evaluated in light of the updated performance indicators, for example, thereby allowing for optimization of the target computer program.

In addition to updating in near real-time aspects, prior to receiving the indication of the plurality of design elements selected by a user, one or more recommendations to select, deselect, modify, use of a particular characteristic, and the like are provided to a user for each of a plurality of design elements that are available for selection. The recommendations may be based on historical performance data for the target computer program to be optimized. In this way, optimization of the target computer program is further facilitated by providing intelligent recommendations prior to receiving any answers to the questionnaire, for example. In one example, prior to receiving the indication of the plurality of design elements selected by a user, the plurality of predicted performance indicators can be communicated as recommendations that correspond to the plurality of design elements available for selection. These recommendations of predicted performance indicators can later be updated and automatically displayed in response to one or more additional indications, wherein the predicted performance indicators change to reflect answers to questions that are selected, deselected, and/or modified, and which correspond to changes in the design elements, and specified via one or more indications.

FIG. 4 depicts a flowchart of another method 400 for optimization of the graphical user interfaces and workflow within a target computer program, accordance with aspect described herein. At block 402, an indication is received of a plurality of design elements selected by a user. In other aspects, only one design element may be selected by a user that time, as each of the plurality of design elements can be individually selected, for example, based on answers to questions in the questionnaire, as previously described. The graphical user interface module can cause automatic display of one or more design elements for selection by a user. At block 404, a key that corresponds to the plurality of design elements selected by the user is matched to at least one graphical user interface preview image stored in a data base. The design manager module of the application may perform the matching, in some aspects. For example, each of a plurality of keys that correspond to the plurality of design elements selected by the user can be matched to one or more graphical user interface preview images stored in a data base. In some aspects, matching is performed by identifying the key that corresponds to the plurality of design elements selected by the user and, using that particular key, determining that an identical key corresponds to the at least one graphical user interface preview image as stored in a data base. Based on matching the key that corresponds to the plurality of design elements selected by the user to at least one graphical user interface preview image stored in a data base, the at least graphical user interface is chosen as representing a single distinct permutation of the plurality of design elements currently selected by the user, in some aspects.

At block 406, the method 400 automatically causes display of the at least one graphical user interface preview image, the at least one graphical user interface preview image including visual representations of the plurality of design elements selected by the user. For example, the graphical user interface module of the application may cause the automatic display of the graphical user interface preview image identified by the design manager module. At block 408, the plurality of design elements selected by the user are mapped to a plurality of steps, the plurality of steps having one or more interdependencies and sequences. The workflow module of the application may perform this mapping, in some aspects. In aspects, mapping the plurality of design elements selected by the user to the plurality of steps includes identifying that the plurality of design elements are linked to one or more of the plurality of design elements. At block 410, a workflow is automatically generated from the plurality of steps using the one or more interdependencies and sequences to arrange the plurality of steps to form the workflow. For example, the workflow module of the application of FIG. 2 may generate the workflow, as previously described. At block 412, a plurality of tests scripts are automatically generated, the plurality of test scripts being identified as corresponding to one or more of the plurality of steps of the workflow. The test script module of the application of FIG. 2 may generate and/or identify specific test scripts to be used to test the workflow steps, in aspects. At block 414, a plurality of predicted performance indicators are calculated based on a similarity of the workflow relative to one or more workflows of other users. The performance module of the application of FIG. 2 may make such calculations. At block 416, the method 400 automatically causes display of the plurality of predicted performance indicators, the plurality of predicted performance indicators being calculated from historical performance data associated with utilization of, based on similarity to the workflow, the one or more workflows by the other users. The graphical user interface module of the application of FIG. 2 may cause such a display, as previously described.

In further aspects, new or different answers in the questionnaire can be input in an on-going manner, such that one or more additional indications are subsequently received via the application, those indications corresponding to design element(s) for the graphical user interface(s) of the target computer program to be optimized. Generally, graphical user interface review images, workflow steps, data collection, test scripts, and performance indicators can be dynamically identified, mapped, matched, calculated, and/or updated without requiring every question in the questionnaire to be answered. As such, a partially answered questionnaire is sufficient for performing the methods herein. This way, the results of different answers on the design elements displayed in the graphical user interface preview images of the target computer program can be evaluated, answer by answer, design element by design element, for example.

For example, another indication can be subsequently received that includes one or more of a selection, a deselection, or a modification of one or more of the plurality of design elements displayed (e.g., based on a new or changed answer(s) in the questionnaire). For each of the one or more of the selection, the deselection, or the modification in the indication, one or more keys that uniquely correspond to the plurality of design elements currently selected by the user can be matched to one of a plurality of graphical user interface preview images stored in a data base. Based on the matching, the one of the plurality of graphical user interface preview images that was matched can be automatically displayed, wherein the one graphical user interface preview image includes a visual representation of the plurality of design elements currently selected by the user and the one or more of the selection, the deselection, or the modification in the indication. Further, for each of the one or more of the selection, the deselection, or the modification in the indication, the plurality of steps in the workflow, the plurality of tests scripts, and the plurality of predicted performance indicators are all updated in near real-time based the plurality of design elements currently selected by the user and the one or more of the selection, the deselection, or the modification in the indication.

Additionally, the method may identify, in a model domain, a first portion of reference data that corresponds to one or more of the plurality of design elements selected by a user and/or one or more of the plurality of steps in the workflow generated, for each instance of an indication that is received. The data collection module can communicate with the graphical user interface module to cause automatic display of the reference data identified, for example, in a new window or under a separate tab in the application. Generally, in aspects, a remainder portion of reference data in the model domain is not presented as not corresponding to the one or more of the plurality of design elements.

Figure 13:
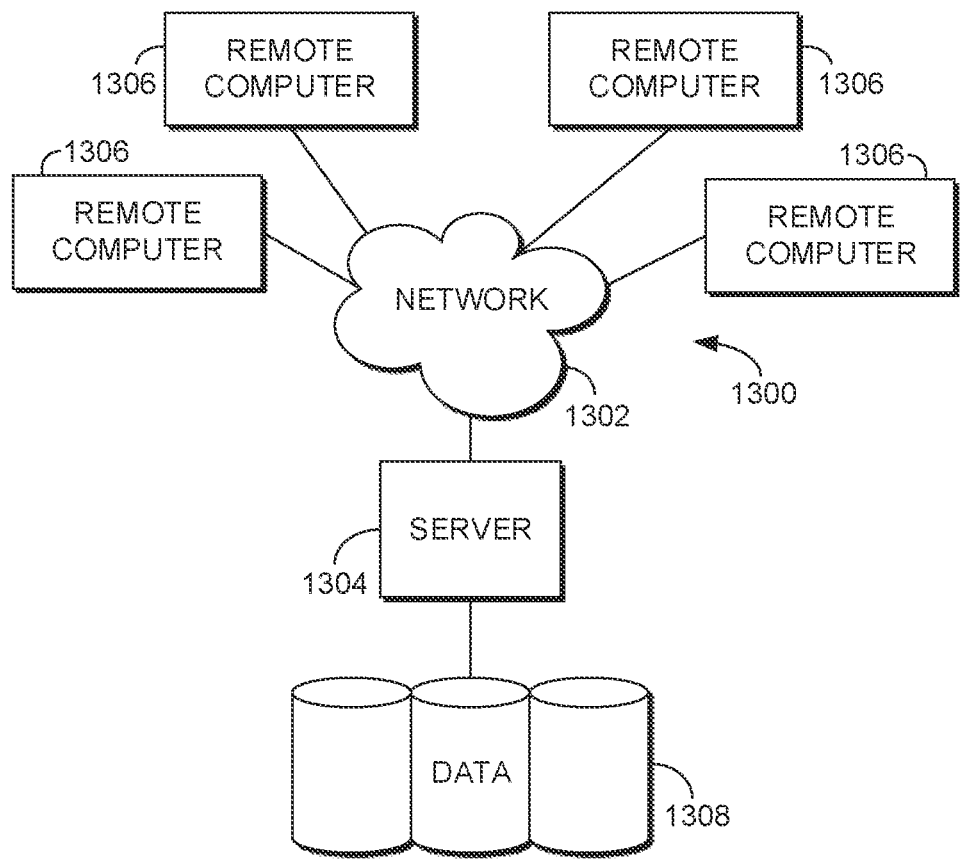
FIG. 13 depicts an example computing environment in accordance with aspects discussed herein.

FIG. 13 depicts an example of a computing environment 1300 in accordance with aspects discussed herein. It will be understood by those of ordinary skill in the art that the computing environment 1300 is just one example of a suitable computing environment and is not intended to limit the scope of use or functionality of the present invention. Similarly, the computing environment 1300 should not be interpreted as imputing any dependency and/or any requirements with regard to each component and combination(s) of components illustrated in FIG. 13. It will be appreciated by those having ordinary skill in the art that the connections illustrated in FIG. 13 are also exemplary as other methods, hardware, software, and devices for establishing a communications link between the components, devices, systems, and entities, as shown in FIG. 13, may be utilized in implementation of the present invention. Although the connections are depicted using one or more solid lines, it will be understood by those having ordinary skill in the art that the exemplary connections of FIG. 13 may be hardwired or wireless, and may use intermediary components that have been omitted or not included in FIG. 13 for simplicity's sake. As such, the absence of components from FIG. 13 should be not be interpreted as limiting the present invention to exclude additional components and combination(s) of components. Moreover, though devices and components are represented in FIG. 13 as singular devices and components, it will be appreciated that some aspects may include a plurality of the devices and components such that FIG. 13 should not be considered as limiting the number of a device or component.

Continuing, the computing environment 1300 of FIG. 13 is illustrated as being a distributed environment where components and devices may be remote from one another and may perform separate tasks. The components and devices may communicate with one another and may be linked to each other using a network 1302. The network 1302 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 1302, generally, provides the components and devices access to the Internet and web-based applications.

The computing environment 1300 comprises a computing device 1304 in the form of a server. Although illustrated as one component in FIG. 13, the present invention may utilize a plurality of local servers and/or remote servers in the computing environment 1300. The computing device 1304 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 1304 may include or may have access to computer-readable media. Computer-readable media can be any available media that may be accessed by computing device 1304, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 1304. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the computing device 1304 uses logical connections to communicate with one or more remote computers 1306 within the computing environment 1300. In aspects where the network 1302 includes a wireless network, the computing device 1304 may employ a modem to establish communications with the Internet, the computing device 1304 may connect to the Internet using Wi-Fi or wireless access points, or the server may use a wireless network adapter to access the Internet. The computing device 1304 engages in two-way communication with any or all of the components and devices illustrated in FIG. 1, using the network 1302. Accordingly, the computing device 1304 may send data to and receive data from the remote computers 1306 over the network 1302.

Although illustrated as a single device, the remote computers 1306 may include multiple computing devices. In an aspect having a distributed network, the remote computers 1306 may be located at one or more different geographic locations. In an aspect where the remote computers 1306 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, the remote computers 1306 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 1306 may be physically located in a non-medical setting, such as a packing and shipping facility or deployed within a fleet of delivery or courier vehicles.

Continuing, the computing environment 1300 includes a data store 1308. Although shown as a single component, the data store 1308 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 1308 includes physical memory that is configured to store information encoded in data. For example, the data store 1308 may provide storage for computer-readable instructions, computer-executable instructions, data structures, data arrays, computer programs, applications, and other data that supports the functions and action to be undertaken using the computing environment 1300 and components shown in exemplary FIG. 13.

In a computing environment having distributed components that are communicatively coupled via the network 1302, program modules may be located in local and/or remote computer storage media including, for example only, memory storage devices. Aspects of the present invention may be described in the context of computer-executable instructions, such as program modules, being executed by a computing device. Program modules may include, but are not limited to, routines, programs, objects, components, and data structures that perform particular tasks or implement particular abstract data types. In aspects, the computing device 1304 may access, retrieve, communicate, receive, and update information stored in the data store 1308, including program modules. Accordingly, the computing device 1304 may execute, using a processor, computer instructions stored in the data store 1308 in order to perform aspects described herein.

Although internal components of the devices in FIG. 13, such as the computing device 1304, are not illustrated, those of ordinary skill in the art will appreciate that internal components and their interconnection are present in the devices of FIG. 13. Accordingly, additional details concerning the internal construction device are not further disclosed herein.

The present invention has been described in relation to particular aspects, which are intended in all respects to be illustrative rather than restrictive. Further, the present invention is not limited to these aspects, but variations and modifications may be made without departing from the scope of the present invention.

What is claimed is:

1. One or more non-transitory computer readable media storing instructions which, when executed by one or more hardware processors, causes performance of operations comprising:
   receiving an indication of a target computer program selected by a user;
   in response to the indication, automatically identifying and retrieving information specific to the indicated target computer program;
   automatically generating, based on the retrieved information, a design questionnaire comprising one or more questions, the one or more questions corresponding to design elements of one or more graphical user interfaces for the indicated target computer program;
   presenting the design questionnaire via a graphical user interface to the user, including presenting a selectable option for each of the one or more questions in the design questionnaire;
   receiving a selection, from the user, of a selectable option for a question; and
   automatically causing display of a preview image for a graphical user interface of the indicated target computer program, the preview image displaying one or more design elements corresponding to the selected selectable option.

2. The one or more media of claim 1, further comprising:
   in response to receiving the selection, from the user, of a selectable option for a question, automatically updating the design questionnaire and presenting the updated design questionnaire, wherein updating comprises at least one of: adding a question or deleting a question.

3. The one or more media of claim 1, wherein the one or more questions correspond to a workflow for the indicated target computer program.

4. The one or more media of claim 1, wherein a question corresponds to one design element.

5. The one or more media of claim 1, wherein a question corresponds to a plurality of design elements.

6. The one or more media of claim 1, wherein the retrieved information includes one or more questions corresponding to design elements of one or more graphical user interfaces for the indicated target computer program.

7. The one or more media of claim 1, further comprising:
presenting a recommendation of a selectable option for a question, prior to receiving the selection from the user of a selectable option for the question.

8. The one or more media medium of claim 7, wherein the recommendation is based on historical performance data for the target computer program.

9. A method comprising:
receiving an indication of a target computer program selected by a user in a graphical user interface;
in response to the indication, automatically identifying and retrieving information specific to the indicated target computer program;
automatically generating, based on the retrieved information, a design questionnaire comprising one or more questions, the one or more questions corresponding to design elements of one or more graphical user interfaces for the indicated target computer program;
presenting the design questionnaire via the graphical user interface to the user, including presenting a selectable option for each of the one or more questions in the design questionnaire;
receiving a selection, from the user, of a selectable option for a question; and
automatically causing display of a preview image for a graphical user interface of the indicated target computer program, the preview image displaying one or more design elements corresponding to the selected selectable option;
wherein the method is performed by at least one device including a hardware processor.

10. The method of claim 9, further comprising:
in response to receiving the selection, from the user, of a selectable option for a question, automatically updating the design questionnaire and presenting the updated design questionnaire, wherein updating comprises at least one of: adding a question or deleting a question.

11. The method of claim 9, wherein the one or more questions correspond to a workflow for the indicated target computer program.

12. The method of claim 9, wherein a question corresponds to one design element.

13. The method of claim 9, wherein a question corresponds to a plurality of design elements.

14. The method of claim 9, wherein the retrieved information includes one or more questions corresponding to design elements of one or more graphical user interfaces for the indicated target computer program.

15. The method of claim 9, further comprising:
presenting a recommendation of a selectable option for a question, prior to receiving the selection from the user of a selectable option for the question.

16. The method of claim 15, wherein presenting the recommendation is based on historical performance data for the target computer program.

17. A system comprising:
one or more hardware processors;
one or more non-transitory computer-readable media; and
an application, the application comprising a graphical user interface module, and a design manager module;
wherein the application comprises hardware instructions stored on the one or more non-transitory computer-readable media which, when executed by the one or more hardware processors:
receives, via the graphical user interface module, an indication of a target computer program selected by a user;
generates automatically, via the design manager module, based on the retrieved information, a design questionnaire comprising one or more questions, the one or more questions corresponding to design elements of one or more graphical user interfaces for the indicated target computer program;
automatically presents, by the graphical user interface module, display of the design questionnaire to the user, including presenting a selectable option for each of the one or more questions in the design questionnaire;
receives, via the graphical user interface module, a selection, from the user, of a selectable option for a question; and
automatically causes, via the graphical user interface module, display of a preview image for a graphical user interface of the indicated target computer program, the preview image displaying one or more design elements corresponding to the selected selectable option.

18. The system of claim 17, wherein the application further:
responsive to receiving the selection from the user of a selectable option for a question, automatically updates, via the design manager module, the design questionnaire; and
presents, via the graphical user interface module, the updated design questionnaire, wherein updating comprises at least one of: adding a question or deleting a question.

19. The system of claim 17, wherein the application further:
presents, via the graphical user interface module, a recommendation of a selectable option for a question, prior to receiving the selection from the user of a selectable option for the question.

20. The system of claim 19, wherein the recommendation is based on historical performance data for the target computer program.

* * * * *